June 27, 1933.  G. R. ERICSON ET AL  1,915,850
MEASURING DEVICE
Filed Oct. 27, 1930   2 Sheets-Sheet 1

INVENTORS
PHILLIP R. WHEELER &
BY  GEORGE R. ERICSON
George R. Ericson
ATTORNEY

Patented June 27, 1933

1,915,850

UNITED STATES PATENT OFFICE

GEORGE R. ERICSON, OF MAPLEWOOD, MISSOURI, AND PHILLIP R. WHEELER, OF ALEXANDRIA, VIRGINIA

MEASURING DEVICE

Application filed October 27, 1930. Serial No. 491,604.

This invention relates to measuring valves and more particularly to measuring valves for use in centralized lubricating systems of the general type shown in the patent to Fitzgerald No. 458,450 and Skelly No. 1,326,142.

Up to the present time, some difficulty has been experienced in making measuring valves of this type capable of accurately measuring the lubricant and still simple and inexpensive enough to be satisfactory from a commercial standpoint.

The object of this invention is to provide a new and improved measuring valve for use in systems of this character.

The invention will be better understood upon reference to the accompanying drawings, referring to which:

Figure 1:
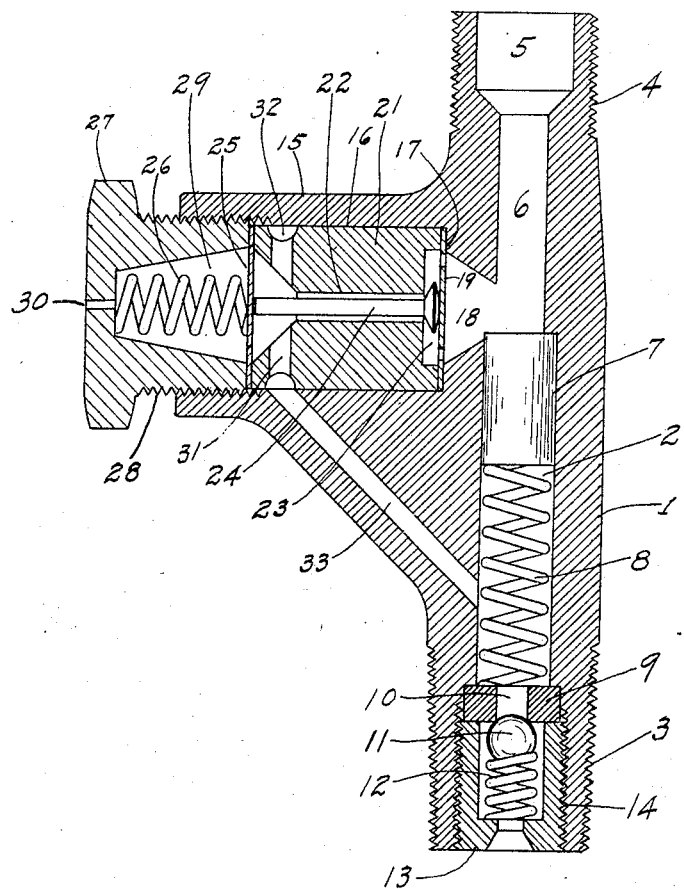
Figure 1 shows a longitudinal sectional view of a measuring valve constructed according to one embodiment of this invention.

The reference numeral 1 indicates a body member having a cylindrical bore 2 formed therein. Suitable screw threads 3 are provided for attaching the body member to a bearing or other device to which lubricant is to be supplied. Screw threads 4 are provided at the other end of the valve for the purpose of attaching the outlet end of the supply conduit.

At the inlet end of the device, an enlarged bore 5 is provided to receive the end of the supply conduit, and a smaller bore 6 connects the bores 5 and 2. A piston 7 is slidably mounted in the bore 2 and normally held at the inlet end of this bore by a spring 8 which is supported by a perforated plug 9, as shown. The perforated plug 9 forms a check valve seat which is normally closed by a ball check valve 11 which check valve is normally held firmly in closed position by a spring 12. The spring is retained by a plug 13 which is retained in the enlarged end of the bore 2 by any suitable means, such as screw threads 14.

The plug 9 may be made of fibre, hard leather, wood, or metal, but it should be noted that a fairly good seating of the valve 11 is important, and this seating of the valve should be maintained against an inlet pressure of substantial force—for instance, twenty-five pounds per square inch. This figure is not intended as a limitation in any sense, but the illustration is taken for the purpose of pointing out that the valve 11 does not open under a negligible pressure, for a reason hereafter to be explained.

Figure 2:
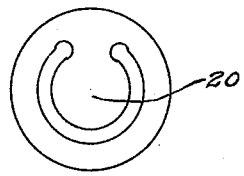
Figure 2 shows a detail view of the valve closing spring used in the valve shown in Figure 1.
Figure 3:
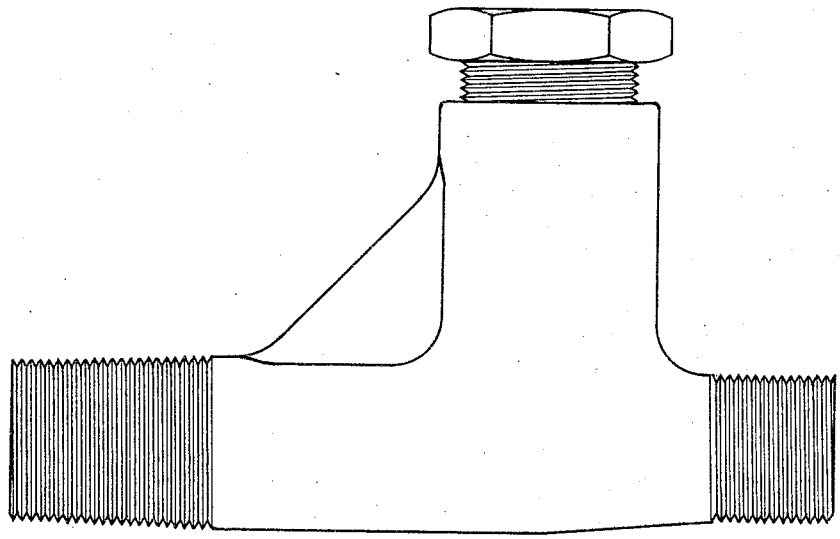
Figure 3 shows a front elevation of the valve shown in Figure 1.
Figure 4:
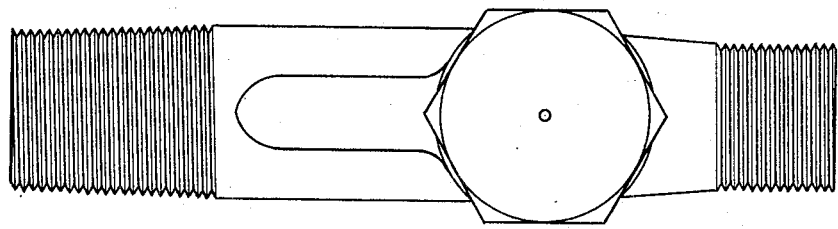
Figure 4 shows a side elevation of the valve shown in Figure 1.

A boss 15 is formed on the side of the body member 1 and is provided with a bore 16 terminating in a shoulder 17. A smaller bore 18 provides communication between the bores 6 and 16. A spring washer 19 is located in the end of the bore 16 against the shoulder 17. This spring washer has a central lip or conformation 20, as shown in Figure 2.

A valve seat member 21 is fitted to the bore 16 and serves to hold the spring washer 19 in place. The member 21 is provided with a bore 22 terminating in a recess 23 adjacent the spring washer 19. A valve 24 is mounted in the bore 22 and provided with a head to close against the inner end of the bore 22. This valve is normally biased to closed position by the resiliency of the lip 20 of the spring washer, but a diaphragm 25 is mounted against the end of the member 21 in such a manner as to rest on the end of the valve stem 24, and a spring 26 of greater strength than the spring 20 rests against the outer side of the diaphragm so as to hold the valve 24 in open position.

A hollow plug 27 is screwed or pressed down firmly, as, for instance, by threads 28, against the diaphragm 25 and accordingly serves to hold the diaphragm and also the member 21 in place. The hollow plug serves as a retainer for the spring 26, as shown, being provided with a chamber 29 to receive the spring, and this chamber is vented as at 30 so that atmospheric pressure will be maintained in the chamber at all times. A cross bore 31 in the member 21 terminates in an annular recess 32.

A diagonal bore 33 provides communication between the recess 32 and that portion of the bore 2 which is normally between the piston 7 and the plug 9.

It will be understood that while we have shown the elements of one form of the new and improved valve, we do not wish to be limited to the exact structure shown, for there are many modifications and improvements which would obviously be within the scope of the invention.

The operation of the device is as follows:

Lubricant is supplied to the bore 6 under intermittent pressure from any convenient source—for instance, such devices as shown in the Skelly or Fitzgerald patents might be used. It will be understood, of course, that there must be some means for accomplishing at least a partial relief of the pressure between the impulses, but it is not necessary that the source should permit the actual return of large quantities of lubricant after the pressure impulses.

The degree of pressure which may remain in the bore 6 is determined by the pressure of the spring 8 when the plunger 7 is at the outlet end of its stroke for the pressure must be reduced sufficiently to permit the initiation, but not necessarily the completion, of the return stroke of this plunger.

The pressure under which the devices operate may be selected according to the conditions under which they are used, and if the valve 11 is set to open at twenty-five pounds, the source should be capable of delivering at least fifty pounds for the best operation. The spring 8 need not have any great degree of strength, but speaking comparatively, if the total pressure available is fifty pounds, the combined strength of the springs 12 and 8 should not exceed thirty-five pounds, and the spring 8 should have a sufficient number of convolutions or be so designed that a pressure of not over forty pounds will move the plunger 7 to the end of its stroke with sufficient force to also overcome the spring 12.

The combined strength of the spring 26 and the diaphragm 25 should be such that the diaphragm will move toward the left, as indicated in Figure 1, and permit the valve 24 to close at a pressure substantially below twenty-five pounds. In other words, the valve 24 must always close before the check valve 11 opens. The stroke of the plunger 7 may be limited either by the spring 8 itself, or suitable stop means may be employed.

When lubricant is supplied to the device under pressure, it first passes through the bore 6, past the valve 24 and through passages 22, 31, 32, and 33, to the outer end of the cylindrical bore 2. When sufficient pressure is built up, say, ten pounds, the diaphragm 25 is forced outwardly against the spring 26, and the valve 24 is closed by the lip 20.

As pressure continues to build up, the plunger 7 is forced toward the check valve 11 which accordingly opens and lubricant is discharged through this valve until the plunger 7 has traveled as far as it will go, thus measuring out a predetermined quantity of lubricant in accordance with the bore and stroke of the plunger 7.

When the pressure at the source is relieved or partially relieved, the plunger 7 can move toward the inlet sufficiently to relieve the pressure on the inner surface of the diaphragm 25. This diaphragm then causes the valve 24 to open, and the plunger 7 then completes its return stroke, by-passing lubricant through the bore 22 and the passages 31 and 33 to the bore 2 on the outlet side of the plunger, and the device is then ready for another operation.

We claim:

1. A measuring device of the class described comprising an intermittently operated measuring piston, valve means for by-passing lubricant during return strokes of the piston to be discharged by said piston at the next forward stroke, and means for controlling said valve means comprising a diaphragm exposed on one side to atmospheric pressure and on the other to lubricant pressure.

2. In a lubricant measuring device, a body member having a cylinder therein, an intermittently operated piston for said cylinder, said cylinder having an inlet adapted to receive lubricant under intermittent pressure, an outlet, a check valve in said outlet, a by-pass in said body member connecting said inlet and said outlet at least while the piston is at the inlet end of the cylinder, and means comprising a member exposed to and movable by said intermittent pressure for controlling said by-pass, said controlling means being movable separately from said piston.

3. A measuring valve comprising a body member having an inlet and an outlet connected by a bore, a piston normally closing said bore, a passageway for by-passing lubricant around said piston, a valve adapted to close said by-pass, and a movable wall normally holding said valve in open position, one side of said wall being exposed to pressure in said by-pass.

4. A measuring valve comprising a body member having an inlet and an outlet connected by a bore, a piston normally closing said bore, a passageway for by-passing lubricant around said piston, a valve adapted to close said by-pass, and a movable wall normally holding said valve in open position, one side of said wall being exposed to pressure in said by-pass, and the other side of said wall being exposed to atmospheric pressure.

5. In a device of the class described, a measuring valve comprising a body member having a cylinder therein, a piston reciprocable in said cylinder, inlet and outlet passages connected with the said cylinder, a by-pass connecting said inlet and outlet passages, spring means for normally holding said piston at the inlet end of said cylinder, a check valve controlling said outlet, valve means for controlling said by-pass, pressure operated means for closing said by-pass valve, said pressure operated means being operative to close said by-pass valve at a pressure lower than the pressure at which said outlet check valve opens.

In testimony whereof, we affix our signatures.

GEORGE R. ERICSON.
PHILLIP R. WHEELER.